Oct. 9, 1951  H. SECKENDORF  2,571,067
AUTOMOBILE JACK
Filed May 17, 1948  2 Sheets-Sheet 1
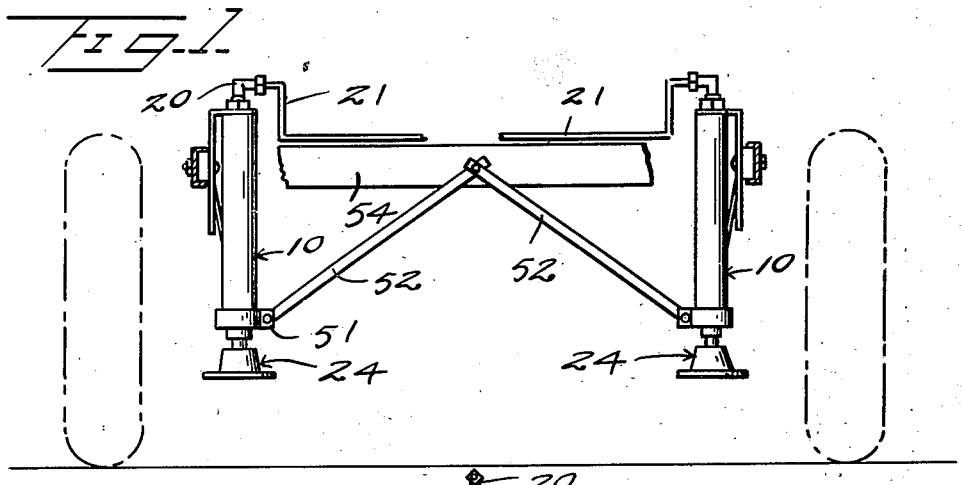
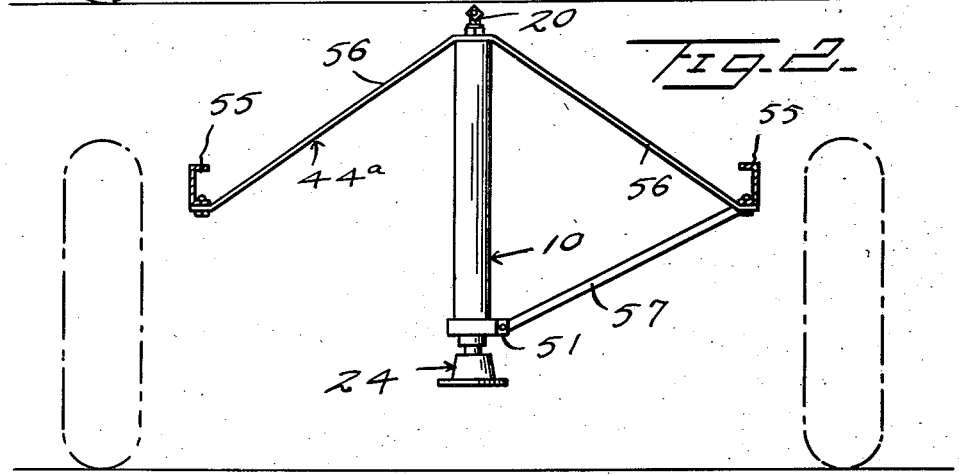
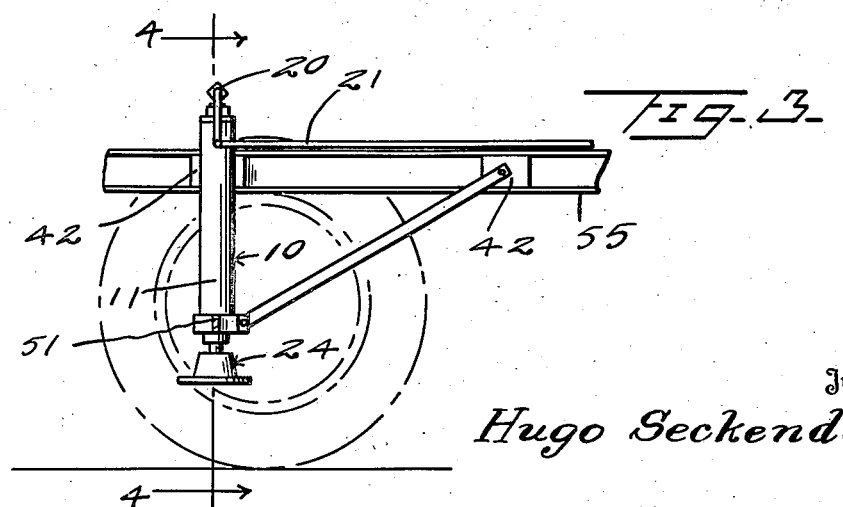
Inventor
Hugo Seckendorf
By Kimmel & Crowell
Attorneys

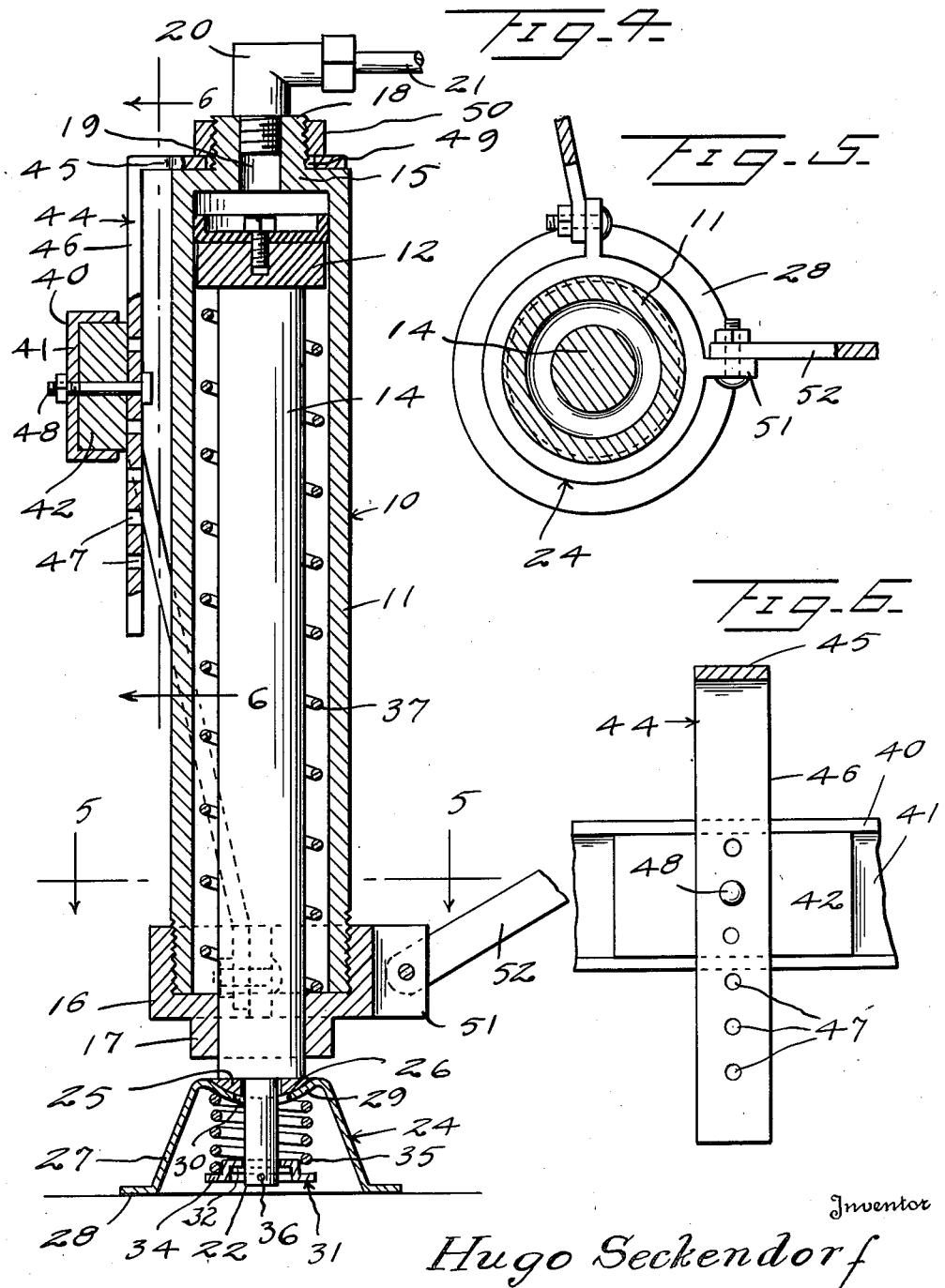

Patented Oct. 9, 1951

2,571,067

UNITED STATES PATENT OFFICE 2,571,067

AUTOMOBILE JACK

Hugo Seckendorf, Albany, N. Y.

Application May 17, 1948, Serial No. 27,546

1 Claim. (Cl. 254—86)

This invention relates to an improved automobile jack.

It is an object of this invention to provide an improved automobile jack of the kind to be more particularly described hereinafter which is particularly adapted to be fixedly mounted on the frame of an automobile and hydraulically operated by a pump mounted in or on the automobile whereby the operator may raise a wheel or the entire end of a car by simply actuating the pump.

Another object of this invention is to provide a jack of this kind which is mounted in operative position in such a manner that it is unnecessary for a mechanic or the like to first position the jack before the raising motion may be started. The jack or jacks are mounted on the frame in a position to raise one end or one wheel of the car when they are extended and are mounted to substantially clear any and all road obstacles which the other parts of the car, as the differential housing, will clear.

Still another object of this invention is to provide an improved foot and foot mounting for a jack of this kind which is swivelly mounted on the hydraulic ram for solidly engaging an inclined surface under the car.

Yet another object of this invention is to provide a jack pad or foot for a jack of this kind which is spring-pressed against the lower end of the ram to prevent rattling when the car is in motion, and so mount the pad that sticking of the pad to the ram or its mounting pin due to rust and corrosion is eliminated thereby insuring proper operation even after long periods of non-use.

It is one aim of the automobile manufacturers to eliminate as much extra weight as possible from the axles when lifting or jacking a car or wheel. This aim is readily accomplished by a jack constructed and arranged according to an embodiment of my invention. Also by using solid tubing the necessity of the use of flexible tubing or hose is eliminated. As the automobile fenders are fixedly mounted on the frame, the construction and arrangement of my jack will raise them sufficiently high to clear the wheels to render them accessible for removal or mounting.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention is claimed.

In the drawings:

Figure 1 is a transverse section, partly broken away, of an automobile showing the mounting of a pair of jacks constructed according to an embodiment of this invention wherein the jacks are supported for raising the rear end of the automobile.

Figure 2 is a transverse section of the automobile, partly broken away, showing the mounting of a single jack for lifting the front end of a vehicle.

Figure 3 is a longitudinal section showing the side elevation of a jack shown in Figure 1.

Figure 4 is a vertical section taken on the line 4—4 of Figure 3.

Figure 5 is a transverse section taken on the line 5—5 of Figure 4.

Figure 6 is a fragmentary vertical section taken on the line 6—6 of Figure 4.

Referring to the drawings, the numeral 10 designates generally a hydraulic jack for an automobile which may be fixedly mounted on the vehicle for selectively raising the front or rear end thereof or a selected wheel. In Figures 1 and 2 the different mountings for the jack 10 are shown. Figure 1 shows the jacks mounted adjacent each of the rear wheels whereby either one of the wheels may be raised independently of the rest of the vehicle or both of the wheels and the rear end of the car may be lifted. Figure 2 shows the mounting of a single jack midway between the two wheels as the jack would be mounted at the front of the car wherein the wheels are separately mounted and it would be advisable to raise the whole front end rather than each of the separate wheels.

When the jacks are mounted on the rear of the car they would be mounted close to the axle and when the jack is mounted in the front of the car it would be mounted most conveniently immediately forward of the radiator of the car between the radiator and the grill. In either preferred mounting the structure of the jack and the jack pad will be the same as will be described hereinafter and the same type of hydraulic lines and connections would be employed.

As shown in Figure 4 of the drawings, the jack 10 is constructed with an outer cylindrical body 11 having a piston 12 slidably mounted therein. A piston rod or shaft 14 is fixed on the lower end of the piston 12 and extends through the lower end of the cylinder. The cylinder is closed at its top end by an apertured wall 15 and a detachable cap 16 closes the lower end. The cap 16 is threadably engaged with the lower end of the cylinder body 11 and a depending boss or bearing 17 is carried by the cap for providing a journal and guide for the shaft 14.

An exteriorly threaded stud 18 is fixed to or formed on the upper end of the cylinder 11 and is preferably formed integral with the cylinder as shown in the drawings. The stud 18 has a central opening 19 to provide an inlet opening for the hydraulic fluid under pressure. An elbow or other connector 20 is adapted to be threadably engaged within the aperture 19 for connecting a hydraulic line 21 to the cylinder 11.

A depending stud 22 is fixed to or formed on the lower end of the rod 14 and is preferably concentric therewith. The lug 22 provides an element of the attaching means for securing a jack pad 24 to the lower end of the piston rod 14. A washer 25 having a central opening 26 is adapted to be loosely engaged about the stud 22. The washer 25 has a flat upper surface and a lower downwardly convex surface for the purpose to be described hereinafter.

The jack pad 24 is formed of a hollow inverted cup-shaped body open at the bottom thereof. The pad 24 is formed with downwardly diverging side walls 27 having an outwardly extending flange 28 at the lower end thereof for engagement with the supporting surface. The top wall 29 of the jack pad is concave upwardly for receiving therein the convex side of the brass washer 25. The top concave wall 29 is provided with an enlarged central opening 30 therein within which the depending stud 22 is adapted to be loosely disposed. The opening 30 is substantially greater than the opening 26 in the washer to provide for the swivel movement of the lug 22 therein.

An annular washer 31 is carried by the lower end of the stud 22 within the confines of the pad 24. The washer 31 is provided with a horizontal wall 32 having a central opening therein through which the stud 22 is adapted to be engaged. A downwardly offset flange 34 is formed on the washer 31 to provide a seat for the lower end of the spring 35. The spring 35 is mounted between the washer 31 and the lower side of the concave top wall 29 of the pad 24. The spring 35 constantly biases the washer 31 downwardly and a pin, as 36, engaging through the lower end of the stud 22 supports the washer 31 on the lower end of the stud. In this way the spring 35 frictionally presses the pad 24 upwardly for engagement with the lower end of the piston rod 14. The enlarged opening 30 in the wall 29 will permit the swivel movement of the stud 22 when the pad 24 is mounted or in engagement with the ground or support at an angle to the horizontal axis of the vehicle to be supported. The swivel movement between the pad 24 and the stud 22 is supported by the washer 25, the bearing surfaces of the top wall 29 abutting the convex surface of the washer.

In the use and operation of this jack 10, hydraulic pressure will be admitted through the inlet tube 21 for forcing the piston and piston rod 14 downwardly within the cylinder 11. A spring 37 disposed about the shaft 14 abuts the upper side of the cap 16 and the lower side of the piston 12 for constantly urging the piston and piston rod 14 upwardly into the cylinder 11. The hydraulic pressure will move the piston and piston rod downwardy against spring tension. The spring mounted jack pad 24 will then search its own support upon engagement with the ground to provide a firm base for the jack.

In Figure 4 the jack 10 is illustrated as mounted on the back of the frame of an automobile or other vehicle. The jack 10 is mounted on one of the longitudinal beams 40 of the frame which is U-shaped in configuration having the horizontal arms fixed to the upper end of a bight portion 41, the beam itself opening inwardly of the vehicle. A mounting pad 42 which may be made of wood or other suitable material is fixed between the mounting bracket for the jack and the beam itself. A mounting bracket as 44 is provided for securing the jack 10 to the beam. The bracket 44 is L-shaped having a horizontal arm 45 at the upper end of the vertical arm 46. The vertical arm 46 is provided with a plurality of openings 47 through one of which a bolt 48 may be engaged for securing the bracket onto the frame. The wooden block 42 provides a shock absorber or anti-rattling device for the mounting of the jack. The horizontal arm 45 is provided with a central opening 49 therein for engagement about the stud 18 for securing the horizontal arm 45 of the bracket 44 to the upper end of the jack 10.

The cap 16 which closes the lower end of the cylinder 11 is provided with an outwardly extending attaching ear 51 to which a supporting arm or rod 52 may be attached for securely supporting the lower end of the jack. In this mounting of the jack 10 the stabilizing arm 52 is connected at the lower end to the ear 51 and the upper end of the rod 52 is connected to a transverse beam or support 54 fixed on the frame of the vehicle. The upper end of the arm 52 is fixed midway the length of the cross arm 54 and an arm 52 connecting a jack on the other side of the vehicle may also be attached at this point.

As shown in Figure 2, the jack 10 is mounted midway between the two front wheels of the vehicle and as stated above is preferably mounted forwardly of the radiator and rearwardly of the grill of the body. An elongated mounting bracket 44a is provided which is attached at its opposite ends to the side frames 55 of the vehicle. The upper end of the jack 10 is fixed midway the length of the supporting bracket 44a in the same manner that the upper end of the jack is supported to the upper end of the bracket 44. The bracket 44 is formed with a pair of side arms 56 which extend upwardly and convergingly together from the side frame members 55 of the chassis of the vehicle. The upper end of the jack 10 is secured at the apex formed by the convergence of these two side arms 56. The lower end of the jack 10 shown in Figure 2 is supported by a single supporting arm 57 disposed in substantially the same relation to the jack as the arm 52 described above. One end of the arm 57 is secured to an ear 51 fixed to or formed on the lower end of the jack and the other end of the rod 57 is fixed to the side frame member 55 of the chassis.

In the use and operation of this jack assembly, a separate pump which may be actuated by the operator is to be provided in the vehicle at a suitable position as in the trunk thereof and separate connecting lines 21 will be connected between the pump and the various jacks although a suitable valve assembly may be utilized for selecting one or more of the jacks as desired.

I claim:

In a jack having a vertical supporting member and a reduced diameter lug depending from the lower end thereof, a mounting pad for said jack comprising an inverted frustroconical cup-shaped body, a flat peripheral flange about the rim of said body, an upwardly uniformly concave top wall having an enlarged opening therein on said body, a downwardly convex brass bearing member loose on said lug seating wholly within said concave wall, said lug engaging through said enlarged opening in said concave wall, a flanged washer on said lug within said body, a compression spring about said lug engaging the flange on said washer and said top wall resiliently holding said bearing member in engagement with said concave wall, and a cotter pin securing said washer on said lug.

HUGO SECKENDORF.

REFERENCES CITED

The following references are of record in the file of this patent:

UNITED STATES PATENTS

| Number | Name | Date |
| --- | --- | --- |
| 392,861 | Geyer | Nov. 13, 1888 |
| 1,065,060 | Leyner | June 17, 1913 |
| 1,810,657 | Kohler | June 16, 1931 |
| 1,957,151 | Pollard | May 1, 1934 |
| 2,381,529 | Willis | Aug. 7, 1945 |
| 2,512,108 | Liptay | June 20, 1950 |